United States Patent [19]

Dijkema et al.

[11] Patent Number: 5,399,422
[45] Date of Patent: Mar. 21, 1995

[54] LAMINATE

[75] Inventors: Jan Dijkema, Zutphen; Paulus C. A. M. Schelbergen, Elst; Jurjen P. Hofland, Westervoort, all of Netherlands

[73] Assignee: Akzo N.V., Netherlands

[21] Appl. No.: 104,603

[22] Filed: Aug. 11, 1993

Related U.S. Application Data

[63] Continuation of Ser. No. 632,535, Dec. 24, 1990, abandoned.

[30] Foreign Application Priority Data

Dec. 23, 1989 [DE] Germany .................. 39 42 813.3

[51] Int. Cl.$^6$ ...................... B32B 15/00; B32B 27/00; B32B 5/22
[52] U.S. Cl. ...................................... 428/285; 428/286; 428/287; 428/302; 428/284; 428/298
[58] Field of Search ................ 428/285, 286, 287, 302

[56] References Cited

U.S. PATENT DOCUMENTS

| | | | |
|---|---|---|---|
| 4,491,617 | 1/1985 | O'Connor et al. | 428/287 |
| 4,539,254 | 9/1985 | O'Connor et al. | 428/287 |
| 4,632,858 | 12/1986 | Knoke et al. | 428/288 |
| 4,647,497 | 3/1987 | Weeks | 428/288 |
| 4,657,804 | 4/1987 | Mayo et al. | 428/287 |
| 4,668,566 | 5/1987 | Braun | 428/286 |
| 4,762,744 | 8/1988 | Woicheshyn et al. | 428/286 |
| 4,778,460 | 10/1988 | Braun et al. | 428/286 |
| 4,780,350 | 10/1986 | O'Connor et al. | 428/287 |
| 4,917,714 | 4/1990 | Kinsley, Jr. | 162/207 |

FOREIGN PATENT DOCUMENTS

| | | |
|---|---|---|
| 0110039 | 9/1983 | European Pat. Off. . |
| 254806 | 4/1987 | European Pat. Off. . |
| 2831640 | 3/1980 | Germany . |
| 77383018 | 7/1983 | Germany . |
| 3405669A1 | 8/1985 | Germany . |
| 3634139A1 | 4/1987 | Germany . |
| 3714093 | 11/1988 | Germany . |
| 1429950 | 3/1976 | United Kingdom . |

OTHER PUBLICATIONS

Dictionary of Textiles-Fairchild, 6th Ed. (1979), p 580.
Dictionary of Fiber and Textile Technology (Hoechst Celanese), 1989, p. 149.
Japanese Abstract, Mar. 1983; 5 9161 435 A.

*Primary Examiner*—George F. Lesmes
*Assistant Examiner*—Kathryne E. Shelborne
*Attorney, Agent, or Firm*—Oliff & Berridge

[57] ABSTRACT

In a method of manufacturing a laminate from at least two layers, a spun bonded nonwoven layer containing thermoplastic endless filaments, as a first layer, and a wetlaid nonwoven layer manufactured by the wet method with short staple fibers made of inorganic fibers (wetlaid nonwoven layer), as the second layer, are bonded together by a joint heat and pressure treatment. To make the wetlaid nonwoven layer, initially short staple fibers, thermoplastic binder, and possible other additives, suspended in water, are applied to a water-permeable substrate that holds back the other components and are dried to form a nonwoven layer. The dried wetlaid nonwoven layer, without further addition of binder, is combined with the spun bonded nonwoven layer before the heat and pressure treatment. A laminate of the invention is composed of at least two layers. A first layer is a spun bonded nonwoven layer containing thermoplastic endless filaments, and a second layer is a wetlaid nonwoven layer containing inorganic fibers. The second layer is a wetlaid nonwoven layer made by the wet method with short staple fibers, which contains a thermoplastic binder by which the first and second layers are bonded together with heat.

15 Claims, No Drawings

LAMINATE

This is a continuation of application Ser. No. 07/632,535, filed Dec. 24, 1990, now abandoned.

FIELD OF THE INVENTION

The present invention relates to a method of manufacturing a laminate composed of at least two different nonwoven layers, as well as a laminate manufactured according to this method.

BACKGROUND

A laminate is known from EP-A-110,039 which has a three-layered structure. The first layer is a scrim, while the other two layers are a spun bonded nonwoven layer containing thermoplastic endless filaments, for example, and a wetlaid nonwoven layer containing inorganic fibers, made-on a paper machine by the so-called wet method. To produce such a laminate, the scrim must be coated with a thermoplastic adhesive to cause the layers to bind to one another. Manufacturing such a laminate requires several steps and is therefore very expensive, especially because the thermoplastic adhesive must be applied to the scrim, which has a very loose and unstable structure. Although EP-A-110,039 states that the manufacturing procedure results in a thinner and more flexible laminate than was known previously, it has been found that this laminate is too stiff for many applications and is also frequently too thick as well. This is especially true when the laminate is used to reinforce roofing material. Although a laminate such as disclosed in EP-A-110,039 can be manufactured more easily and economically than previously known laminates, it would still be desirable to manufacture such laminates in an even simpler and more economical fashion.

OBJECTS AND SUMMARY OF THE INVENTION

It is therefore an object of the present invention to provide a method of manufacturing a laminate, especially for use in reinforcing roofing material, which is particularly simple and economical to perform and results in a laminate which is more flexible and thinner than those known previously.

It is another object of the present invention to provide a laminate which is more flexible than known laminates, which can be manufactured economically, and which has a limited thickness despite its desired high modulus. It has been assumed in this connection that a two-layer structure of the laminate is sufficient for many purposes provided the laminate has the desired high modulus and resistance to delamination.

To achieve the foregoing and other objects, and to overcome the shortcomings discussed above, a method of manufacturing a laminate from at least two layers is disclosed. The at least two layers are bonded together by heat and pressure treating. The first layer is a spun bonded nonwoven layer containing thermoplastic endless filaments, and the second layer is a wetlaid nonwoven layer manufactured by the wet method with short-staple fibers made of inorganic fibers, hereinafter called a wetlaid nonwoven layer. Despite providing the above-mentioned properties, a scrim can be eliminated. The objects of the invention can be achieved without a scrim by virtue of the fact that in the manufacture of the wetlaid nonwoven layer, short staple fibers, thermoplastic binder, and possibly other additives are initially suspended in water and applied to a base which is permeable to water but holds back the other components, and dried to form a nonwoven layer, after which the dried wetlaid nonwoven layer is fed together with the spun bonded nonwoven layer to the heat and pressure processing without adding additional binder.

DETAILED DESCRIPTION OF PREFERRED EMBODIMENT

It has surprisingly been found that adding thermoplastic binder to the mixture from which the wetlaid nonwoven layer is produced is sufficient to hold a spun bonded nonwoven layer and a wetlaid nonwoven layer together following heat and pressure treatment. The expensive intermediate step of the prior art involving coating one of the laminate layers with a binder can therefore be eliminated. A laminate produced by the present method surprisingly exhibits a high degree of flexibility and very limited thickness, yet has a sufficiently high modulus. In addition, the resistance of the laminate to delamination is surprisingly good.

The heat and pressure treatment which is used to produce the laminate of the invention is known. It involves heating the superimposed layers under pressure in such a way that the thermoplastic binder melts so that the thermoplastic binder holds the individual layers together. The spun bonded nonwoven layer composing the endless filaments does not melt, although in the case of endless bicomponent filaments the jacket melts. However, it is important to note that the pressure treatment is performed, if possible, while applying pressure over an area.

The manufacture of a spun bonded nonwoven layer (first layer) from thermoplastic endless filaments is also known. Spun bonded nonwoven material that can be used to make the laminate according to the invention preferably contains polyester filaments. It is especially favorable for these endless filaments to be bicomponent filaments, one of whose components is a polyester. Bicomponent filaments which exhibit a core-skin structure have proven especially advantageous, with the core component being a polyester. The skin component serves to solidify the spun bonded nonwoven layer and is preferably made of the same thermoplastic material as the thermoplastic binder of the wetlaid nonwoven layer. The polymers are fused to one another in such a way that the thermoplastic binder adheres well to the endless filaments of the spun bonded nonwoven layer, possibly to the skin of the endless bicomponent filaments. Thermoplastic binders of this kind are sufficiently known.

During the manufacture of the wetlaid nonwoven layer (second layer), an aqueous suspension of short staple fibers, thermoplastic binder and, possibly, other additives, is applied to a water-permeable base which retains the other components and is dried to form the wet-laid nonwoven layer. After drying, a typical nonwoven structure associated with the wet method results. The thermoplastic binder can be present in the mixture in the form of powder, fibrils, fibrids, fibers, or as an emulsion. To improve the handling of the finished wet-laid nonwoven layer, a chemical binder and/or polyvinyl alcohol fibers or powder can be added, giving the resultant wetlaid nonwoven layer improved strength for further processing when dry. The term short staple fibers according to the present invention means that the fibers have a maximum length of 50 mm. Glass fibers are especially satisfactory as inorganic fibers for the short staple fibers. Water generally is used as the suspension fluid, though aqueous foam can also be used. In particular, foam permits processing longer fibers (12 to 50 mm) and the use of a thermoplastic binder in powder form. Aqueous foams also have the advantage in that less water is generally contained in the total mixture (short staple fibers, foam, binder, and other optional additives) and thus less energy is required to evaporate the water to dry the wetlaid nonwoven layer.

The method according to the invention is also exceptionally well suited for manufacturing a trilaminate, where a spun bonded nonwoven layer is applied to either side of the wetlaid nonwoven layer before the joint heat and pressure treatment. The thermoplastic binder contained in the wetlaid nonwoven layer is sufficient to bond the two spun bonded nonwoven layers to the wetlaid nonwoven layer. Such a trilaminate, when used in roofing material, exhibits excellent handling and laying ability. When used to make three-dimensional molded parts by heat shaping, such a laminate has especially good shaping ability.

The method according to the invention is especially economical when endless filaments are added to one or both sides of the dried wetlaid nonwoven layer to produce the spun bonded nonwoven layer, the filaments being combined during subsequent heat and pressure treatment to form a spun bonded nonwoven layer attached on one or both sides of the wetlaid nonwoven layer to give a laminate.

In those cases in which the modulus of the finished laminate is not too high, yarns made of endless filaments, especially polyester filaments and/or glass filaments, can be added when manufacturing the wetlaid nonwoven layer when the mixture is applied to the water-permeable substrate. It is especially favorable to add these endless filaments at a uniform spacing, and for the yarns in the form of endless filaments to be added in the form of a scrim. This ensures that the scrim is located inside the wetlaid nonwoven layer. In the latter case, the result is a laminate of high flexibility and very limited thickness. Because the application of a thermoplastic binder to the scrim can be eliminated according to the invention, laminate manufacture is much more economical than by the methods known previously.

Surprisingly, it has also been found that in the method according to the invention, one scrim can be added to one or both sides, between the wetlaid nonwoven layer and the spun bonded nonwoven layer, before the heat and pressure treatment, without the laminate suffering from decreased resistance to delamination as a consequence. In the present case, three to five-layer laminates can be made. In the simplest case, the laminate can consist of spun bonded nonwoven layer, scrim, and wetlaid nonwoven layer. A five-layer structure could be composed of spun bonded nonwoven layer, scrim, wetlaid nonwoven layer, scrim, and thin nonwoven layer.

After making the laminate according to the invention, it is clearly evident from the various layers which layer is the spun bonded nonwoven layer and which layer is the wetlaid nonwoven layer made by the wet method. The special physical appearance is characterized by the terms "spun bonded nonwoven" and "wetlaid nonwoven", as indicated in ISO 9092 as well, to which specific reference is made.

An object of the invention is also achieved by a laminate composed of at least two layers, with a first layer being a spun bonded nonwoven layer containing thermoplastic endless filaments, and a second layer being a nonwoven layer containing inorganic fibers, wherein the second layer is a wetlaid nonwoven layer which is made by the wet method with short staple fibers and which contains a thermoplastic binder for bonding the first and second layers together with the application of heat.

To increase the modulus of the laminate, the first layer also preferably contains inorganic endless filaments. In addition, to increase flame resistance, the inorganic fibers used according to the invention (possibly the inorganic filaments) are preferably glass fibers and endless glass filaments.

The laminates according to the invention, as previously mentioned, are not limited to two layers; they can contain additional layers. For example, in a three-layer structure, the wetlaid nonwoven layer can be located on one or both outer sides of the spun bonded nonwoven layer, or vice versa. If the laminate according to the invention is to be especially easy to process, it is preferable to use a spun bonded nonwoven layer for the outer layers of the laminate.

Spunbonded nonwoven layers that contain endless bicomponent filaments are especially suitable as spun bonded nonwoven layers. The spun bonded nonwoven layer in this case can also consist completely of bicomponent filaments. A polyester has proven to be advantageous as one of the two components of the bicomponent filaments, especially when the bicomponent filaments have a core-skin structure, with the core consisting of a polyester. Preferably the skin component of these core-skin filaments consists of a thermoplastic polymer which has a much lower melting point than the core component.

Laminates according to the invention can be given excellent characteristics with impregnating agents or coatings. In addition, the spun bonded nonwoven layer can also contain thermoplastic binders, for example in the form of the skin component of the above-mentioned core-skin threads, to bond the layers together.

Because their modulus is high even at high temperatures, the laminates according to the invention are extremely well suited for use in making roofing material which is characterized by ease of handling. The laminates according to the invention can also be easily used, because of their good thermal moldability, to make molded parts like those employed, for example, in the interiors of automobiles, automobile headliners, door linings, etc. These laminates are also suitable for making filter materials.

The laminates of the present invention exhibit especially favorable and long lasting flame-repelling and fire-retardant properties if at least one scrim of glass fibers is contained in the laminate. This makes them especially well suited for fire-repellent installation, for example on exterior and/or interior walls. The laminates according to the invention have proven highly suitable as roof coverings, especially with the laminates being impregnated with bitumen before being laid in the usual fashion on the roof. During handling and laying, the flame-repelling property of the laminate, which is also relatively thin, flexible, and dimensionally stable, has been found to be especially advantageous. Roofing materials that contain trilaminates according to the invention adapt particularly well to the substrate, for example without forming undulations.

The invention will now be described in greater detail with reference to the following examples.

EXAMPLE 1

A wetlaid nonwoven layer weighing 50 g/m$^2$ is produced with an aqueous suspension containing short staple glass fibers (glass fibers with an average length of 12 mm and a thickness of 11 microns), 10 wt. %, based on the finished dried wetlaid nonwoven layer, of polyamide 6 fibers (average fiber length 6 mm, thickness 14 microns) and 5 wt. %, based on the finished dried wetlaid nonwoven layer, of polyvinyl alcoholfibers (average fiber length 3 mm, thickness 9 microns). The suspension is applied to a water-permeable base and dried to a wetlaid nonwoven layer. The resultant wetlaid nonwoven layer is provided on both sides with filaments and solidified into spun bonded nonwoven layer by a heat and pressure treatment whereby the filaments are then bonded to the wetlaid nonwoven layer. Both spun bonded nonwoven layers then have a weight per unit area of 100 g/m$^2$ and are composed of core-skin endless filaments whose cores are made of polyethylene terephthalate and whose skins are made of polyamide 6, with an average filament thickness of 38 microns. The heat and pressure treatment is performed such that the three superimposed layers are fed between two air-permeable conveyor belts, with hot air at a temperature of about 225° C. being blown through the three-layer structure. During heat and pressure treatment, a pressure per unit area of about 1500 Pa is applied to the three-layer structure through the conveyor belts during heat treatment. The resultant laminate is impregnated and/or coated with bituminous material. The resultant roofing material exhibits excellent laying properties. The laid roofing material is definitely superior to the minimum values specified in DIN 4102 for flame-repellency and fire-retardant properties.

EXAMPLE 2

Example 1 is repeated with the following changes: The wetlaid nonwoven layer weighs 30 g/m$^2$ with 20 wt % of polyamide 6 fibers added as the thermoplastic binder based on the finished dried wetlaid nonwoven layer. To make the spun bonded nonwoven layer, core-skin filaments with an average filament thickness of 24 microns are used. The spun bonded nonwoven layer has a weight of 50 g/m$^2$. The resulting laminate is especially suitable for manufacturing three-dimensional molded parts.

EXAMPLE 3

A wetlaid nonwoven layer weighing 50 g/m$^2$ is produced, with short staple glass fibers in an aqueous suspension (average length 12 mm, thickness 11 microns), 10 wt. %, based on the dried wetlaid nonwoven layer of copolyester fibers (average length 6 mm, thickness 23 microns), and 10 wt. %, based on the dried wetlaid nonwoven layer, of polyvinyl alcohol powder. A needled polyester spun bonded nonwoven layer (polyester filaments 23 microns thick) is applied to this wetlaid bonded nonwoven layer such that after heat and pressure treatment, the spun bonded nonwoven layer has a weight per unit area of 200 g/m$^2$. During the heat and pressure treatment, hot air at about 225° C. is blown through the two layers, while maintaining a pressure of about 1500 Pa. The resultant bilaminate is especially suitable for making roofing material.

What is claimed is:

1. A laminate comprising:
   a first spun bonded nonwoven layer comprising thermoplastic endless filaments;
   a wetlaid nonwoven layer manufactured by the wet method, wherein said wetlaid nonwoven layer comprises a uniform mixture of short staple inorganic fibers and a thermoplastic binder;
   said first spun bonded nonwoven layer and said wetlaid nonwoven layer having been bonded together by said thermoplastic binder of said uniform mixture by application of heat, an amount of said binder being sufficient to hold said layers together.

2. The laminate of claim 1, wherein said first spun bonded nonwoven layer further comprises inorganic endless filaments.

3. The laminate of claim 2, wherein said inorganic endless filaments are glass filaments.

4. The laminate of claim 1, further comprising a second spun bonded nonwoven layer comprising thermoplastic endless filaments, said second spun bonded nonwoven layer being on an opposite side of said wetlaid nonwoven layer from said first spun bonded nonwoven layer.

5. The laminate of claim 1, wherein said first spun bonded nonwoven layer comprises endless bicomponent threads.

6. The laminate of claim 5, wherein one component of said bicomponent threads is a polyester.

7. The laminate of claim 6, wherein said bicomponent threads have a core and skin structure, wherein the core comprises a polyester.

8. The laminate of claim 1, wherein said portions of the thermoplastic filaments and portions of the thermoplastic binder are melted together.

9. The laminate of claim 8, wherein the melted portions of the thermoplastic filaments and the thermoplastic binder are of substantially the same material.

10. The laminate of claim 9, wherein the thermoplastic binder is in filamentary form.

11. The laminate of claim 1, further comprising an uncoated scrim disposed between the first spun bonded nonwoven layer and the wetlaid layer.

12. The laminate of claim 1, further comprising a scrim disposed within the wetlaid layer.

13. The laminate of claim 1, wherein the thermoplastic binder is in filamentary form.

14. The laminate of claim 1, wherein said inorganic fibers are glass fibers.

15. The laminate of claim 1, wherein said laminate does not include a scrim.

* * * * *

UNITED STATES PATENT AND TRADEMARK OFFICE
CERTIFICATE OF CORRECTION

PATENT NO. : 5,399,422
DATED : March 21, 1995
INVENTOR(S) : Jan DIJKEMA et al.

It is certified that error appears in the above-indentified patent and that said Letters Patent is hereby corrected as shown below:

Col. 1, line 19, change "made-on" to --made on--.

Col. 5, line 12, change "alcoholfibers" to --alcohol fibers--.

Signed and Sealed this

Twenty-third Day of May, 1995

Attest:

BRUCE LEHMAN

*Attesting Officer*   *Commissioner of Patents and Trademarks*